United States Patent [19]

Waugh

[11] 4,258,523
[45] Mar. 31, 1981

[54] GRAPE STAKE

[76] Inventor: Charles J. Waugh, 11 S. Hidalgo Ave., Alhambra, Calif. 91801

[21] Appl. No.: 90,404

[22] Filed: Nov. 1, 1979

[51] Int. Cl.³ .............................................. E04C 3/30
[52] U.S. Cl. ............................................ 52/732; 47/47
[58] Field of Search ............... 52/735, 40, 165, 732; 47/47; 256/32, 34, DIG. 5, 21, 1, 22; 404/10; 40/606

[56] References Cited

U.S. PATENT DOCUMENTS

| | | | |
|---|---|---|---|
| 1,928,432 | 9/1933 | Murton | 52/40 |
| 2,029,439 | 2/1936 | Ochiltree | 57/733 X |
| 4,105,350 | 8/1978 | O'Donnell | 404/10 X |

*Primary Examiner*—Price C. Faw, Jr.
*Assistant Examiner*—Carl D. Friedman
*Attorney, Agent, or Firm*—Bruce L. Birchard

[57] ABSTRACT

By forming a metal stake with a "W"-shaped cross-section and knurling the edges of the stake instead of notching them, a stake is provided with superior torsional strength and the ability to support securely wire of any size or combination of sizes at any desired height or spacing.

7 Claims, 2 Drawing Figures

GRAPE STAKE

BACKGROUND OF THE INVENTION

1. Field of the Invention

This invention relates to supporting stakes or poles and particularly to such stakes or poles adapted for agricultural applications.

2. Prior Art

Prior art stakes came in many configurations, such as with a channel cross-section and with vertically spaced hooks to hold the wires in place. The channel cross-section did not represent an optimum strength for the weight or thickness of the steel used to make the stake. Further, if an attempt were made to minimize the gauge of the steel used the stakes or posts could not withstand the forces, particularly torsional forces, to which the stakes were subjected from time-to-time when, for example, agricultural machines, such as mechanized pickers, hit the wires supported by the stakes. Further, wire heights were dictated by the relatively widely-spaced hooks on the stakes. If notches were used instead of hooks, the notches removed edge strength of the stakes and, furthermore, cut the wire or wires being supported.

It is an object of my invention, therefore to overcome the general problems and disadvantages set forth hereinbefore.

It is a further object of my invention to provide an improved stake with great flexibility in wire positioning and great torsional strength.

SUMMARY OF THE INVENTION

Stated succinctly, by providing a stake with a "W"-shaped cross-section and knurled edges a high level of torsional strength is achieved while providing great flexibility in the vertical placement of the supported wire without fear of cutting of the supported wire.

BRIEF DESCRIPTION OF THE DRAWINGS

My invention, both as to its nature and operation, may best be understood by the description which follows, taken in conjunction with the drawings herein, in which.

DETAILED DESCRIPTION OF THE PREFERRED EMBODIMENT

Figure 1:
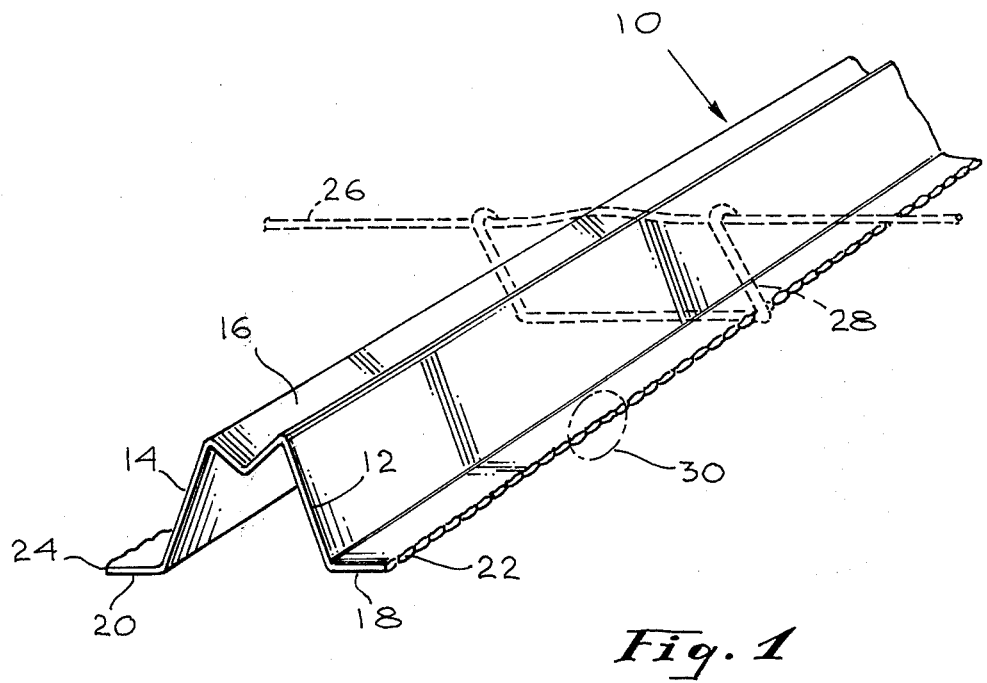
FIG. 1 is a perspective view of a grape stake according to my invention.

In FIG. 1, stake 10 may be formed from 17 to 18 gauge steel which is galvanized. It has a cross-section which is "W"-shaped (shown inverted in FIG. 1) with leg portions 12 and 14 joined by integral trough portion 16. Flange portions 18 and 20 are extensions of leg portions 12 and 14, respectively. Flange portions 18 and 20 terminate in edges 22 and 24, respectively. The wire (such as a trellis wire) to be supported is shown, in phantom lines, as element 26 in FIG. 1. The clip or clamping wire 28, which holds wire 26 securely against stake 10 is also shown in phantom lines in FIG. 1. Clip 28 engages edges 22 and 24 of stake 10 and, more specifically, engages the knurls in edges 22 and 24 of FIG. 1. The configuration of these knurls can be seen more clearly in FIG. 2, which is an enlargement of portion 30 of FIG. 1.

The trough section 16 of FIG. 1 gives an unexpected amount of torsional strength to stake 10 so that it may withstand the rigors of outdoor use and, more specifically, the great torsional strains experienced by such stakes when the wire or wires they are supporting are hit by agricultural machinery such as mechanized grape pickers or other agricultural implements.

Figure 2:
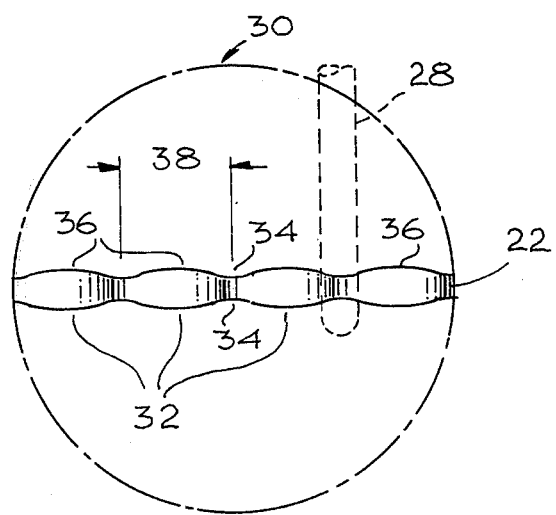
FIG. 2 is an enlarged view of a portion of the stake of FIG. 1.

Turning to FIG. 2, the knurls 32 in edge 22 are shown. Knurling relies upon the malleability of a material to re-shape it. As the knurling tool passes over the opposed surfaces of the edge 22 it presses the material out of valleys 34 into contiguous ridges 36. No metal is removed in the process. Even the galvanizing coating remains attached to the base metal. Thus, edge-strength is retained and rusting is prevented. Further, no sharp edges are formed during knurling and the cutting of the support clips 28 is avoided, as contrasted with notched edges found in prior art devices.

The separation 38 of adjacent valleys 34 is approximately 10 mm. It is apparent, therefore, that wire 26 can be supported very accurately at the desired elevation by means of clip 28 engaging it and the appropriate valley 34.

As has been indicated, knurling displaces metal. It does not remove it. Thus the thickness of the metal at the ridges 36 may reach 0.065 inches whereas the nominal thickness of 18 gauge steel is 0.048 inches. The edges remain strong despite the knurling in contrast to weakness which can be introduced by notching.

While a particular embodiment has been shown and described it whould be apparent to one skilled in the art that variations and modifications may be made without departing from the scope of my invention. It is the purpose of the attached claims to cover all such variations and modifications.

I claim:

1. A stake having a pair of oppositely sloped leg portions joined by a common trough portion, each leg portion having a flange section extending at an obtuse angle with respect to its associated leg portion and parallel to the other flange section, each flange section terminating in an edge, each such edge being knurled.

2. Apparatus according to claim 1 in which said stake is metallic in nature.

3. Apparatus according to claim 2 in which said stake is of galvanized steel.

4. Apparatus according to claim 1 in which the knurl has ridges and valleys and said valleys are spaced about 10 millimeters, one from the next.

5. Apparatus according to claim 3 in which the knurl is galvanized over its entire surface.

6. Apparatus according to claim 1 in which said stake is "W"-shaped in cross-section.

7. Apparatus according to claim 1 in which each such edge is knurled over its entire length.

* * * * *